Oct. 1, 1968
A. J. BELL ET AL
3,403,873
GUIDED MISSILE
Filed Jan. 24, 1963
9 Sheets-Sheet 1
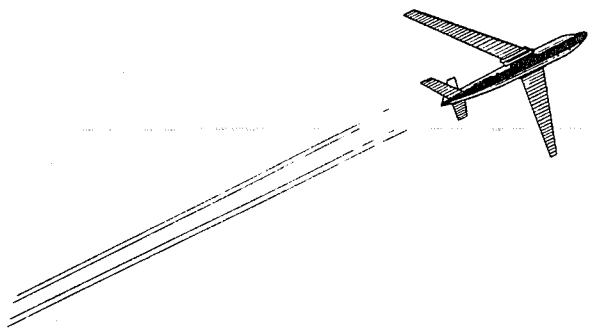
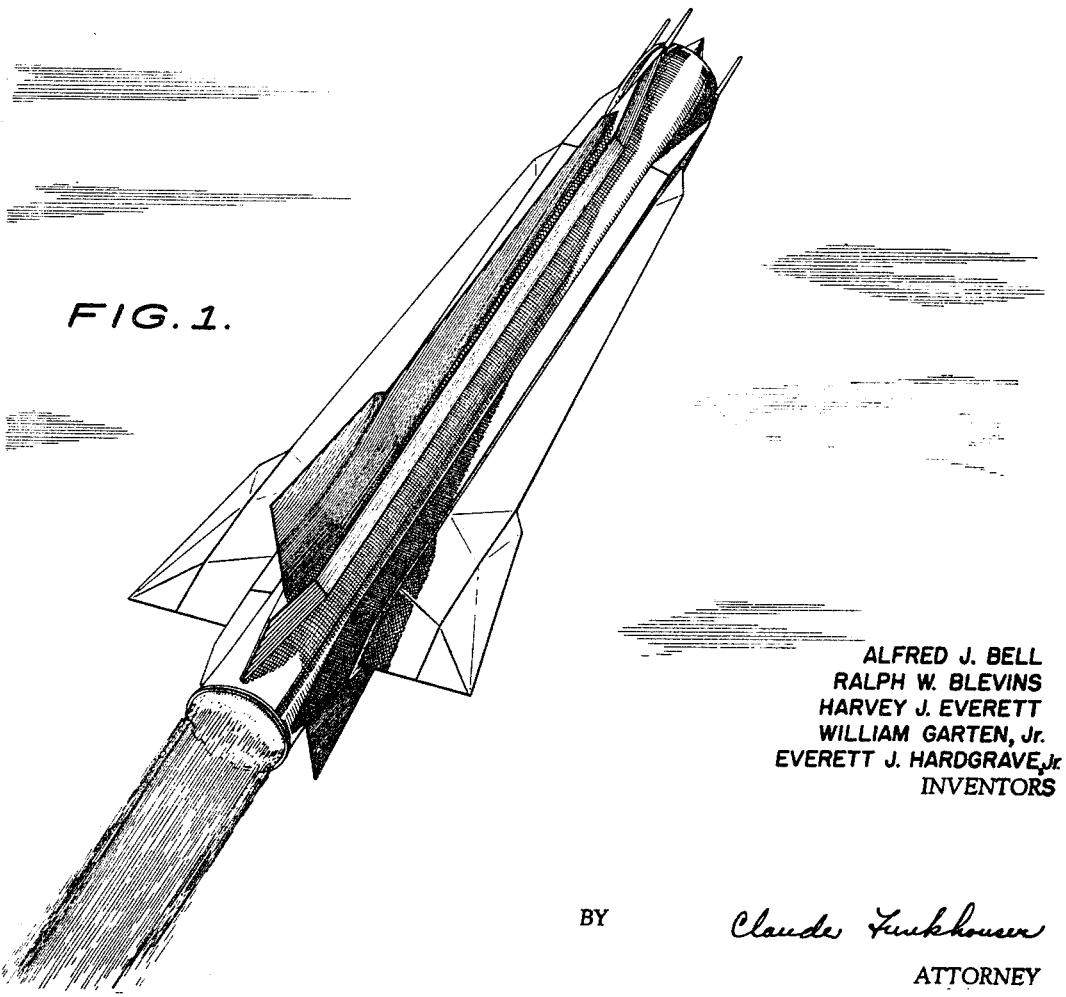
FIG.1.
ALFRED J. BELL
RALPH W. BLEVINS
HARVEY J. EVERETT
WILLIAM GARTEN, Jr.
EVERETT J. HARDGRAVE, Jr.
INVENTORS
BY *Claude Funkhouser*
ATTORNEY Oct. 1, 1968     A. J. BELL ETAL     3,403,873
GUIDED MISSILE
Filed Jan. 24, 1963     9 Sheets-Sheet 2
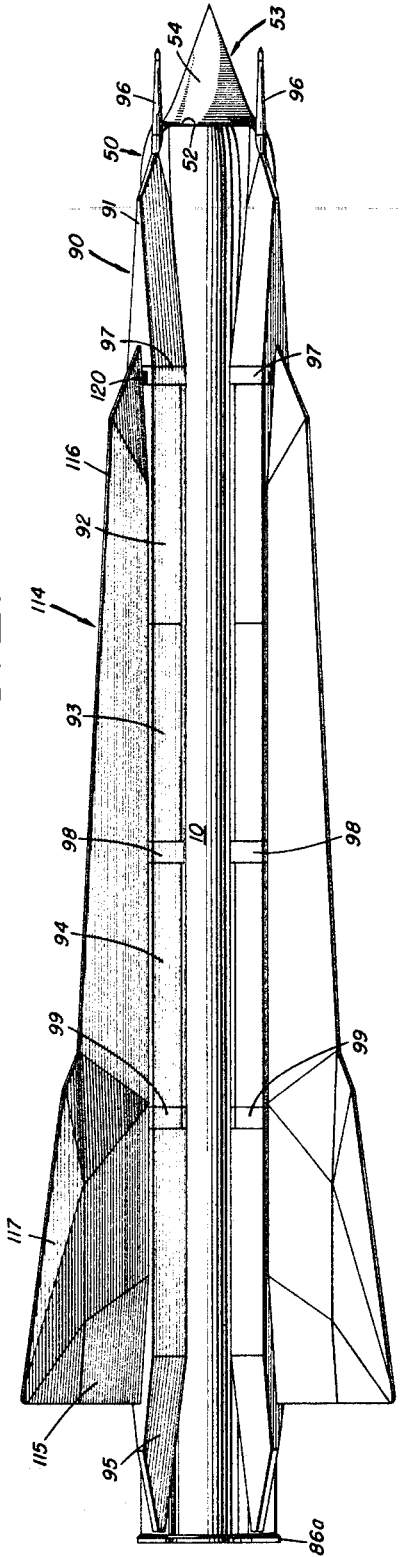
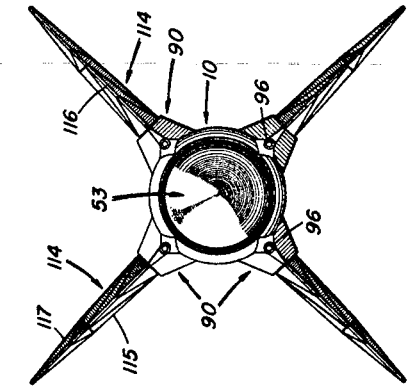
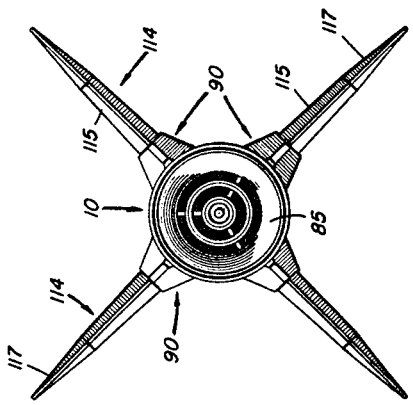
A. J. BELL
R. W. BLEVINS
H. J. EVERETT
W. GARTEN, Jr.
E. J. HARDGRAVE, JR.
INVENTORS
BY Claude Funkhouser
ATTORNEY Oct. 1, 1968  A. J. BELL ETAL  3,403,873
GUIDED MISSILE
Filed Jan. 24, 1963  9 Sheets-Sheet 3
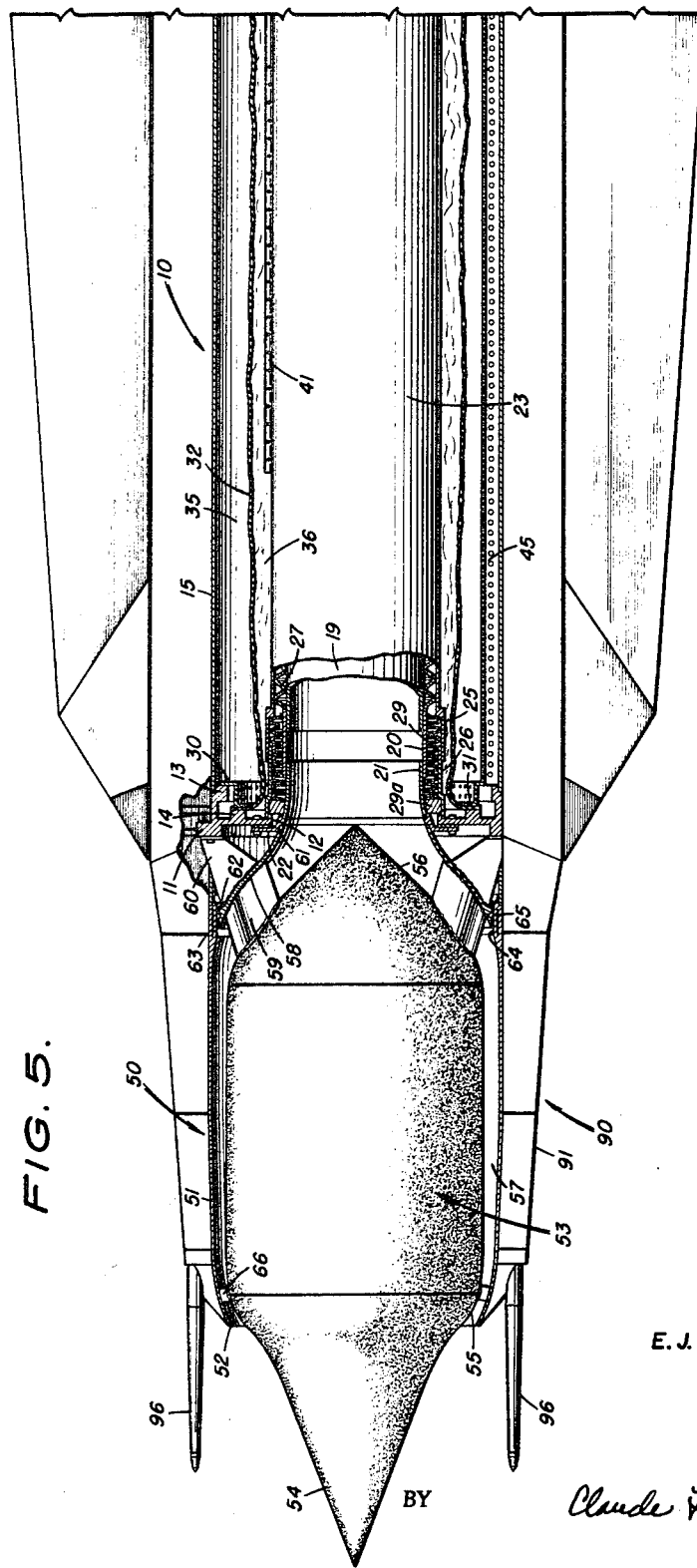
A. J. BELL
R. W. BLEVINS
H. J. EVERETT
W. GARTEN, Jr.
E. J. HARDGRAVE, JR.
INVENTORS
BY Claude Funkhouser
ATTORNEY Oct. 1, 1968
A. J. BELL ETAL
3,403,873
GUIDED MISSILE
Filed Jan. 24, 1963
9 Sheets-Sheet 4
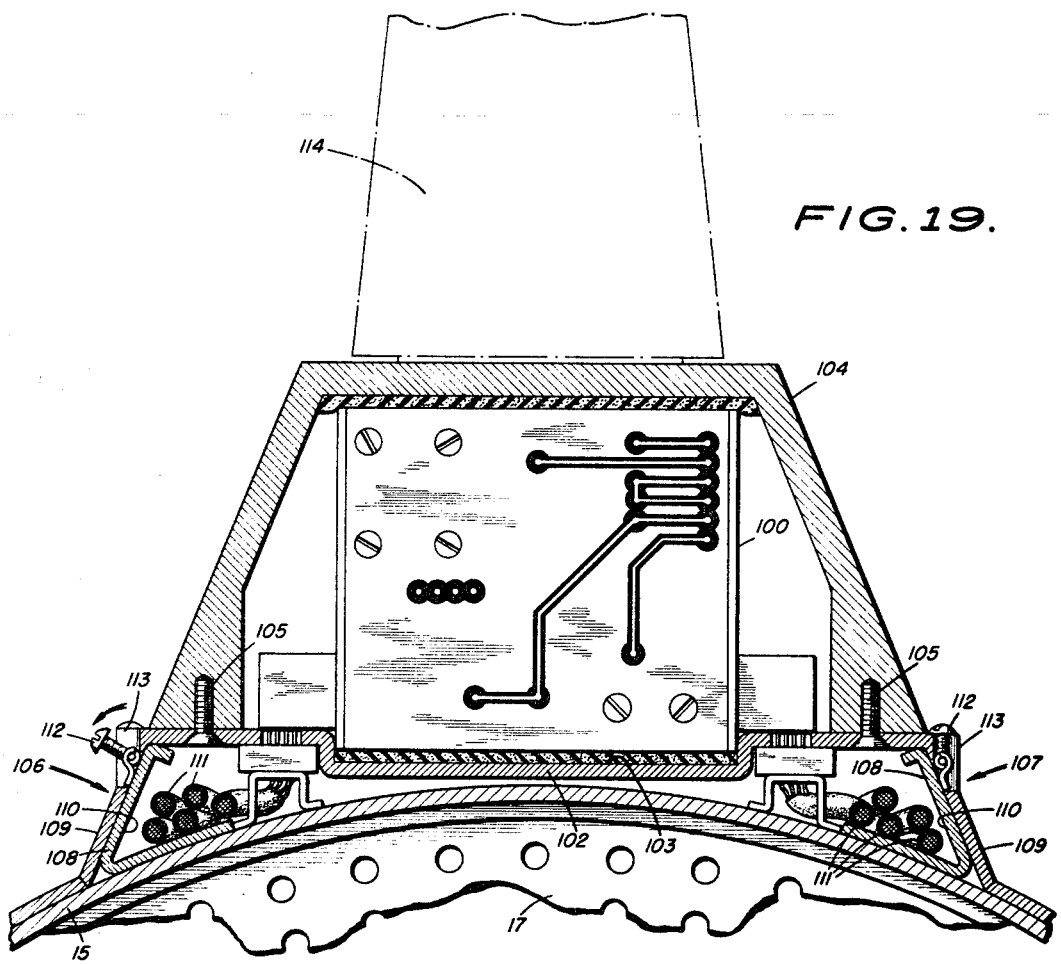
FIG. 19.
FIG. 5a.
A. J. BELL
R. W. BLEVINS
H. J. EVERETT
W. GARTEN, Jr.
E. J. HARDGRAVE, JR.
INVENTORS
BY
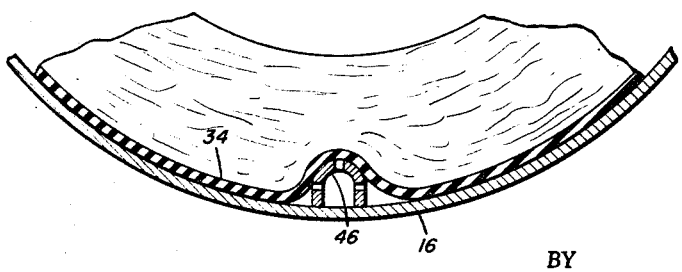
ATTORNEY

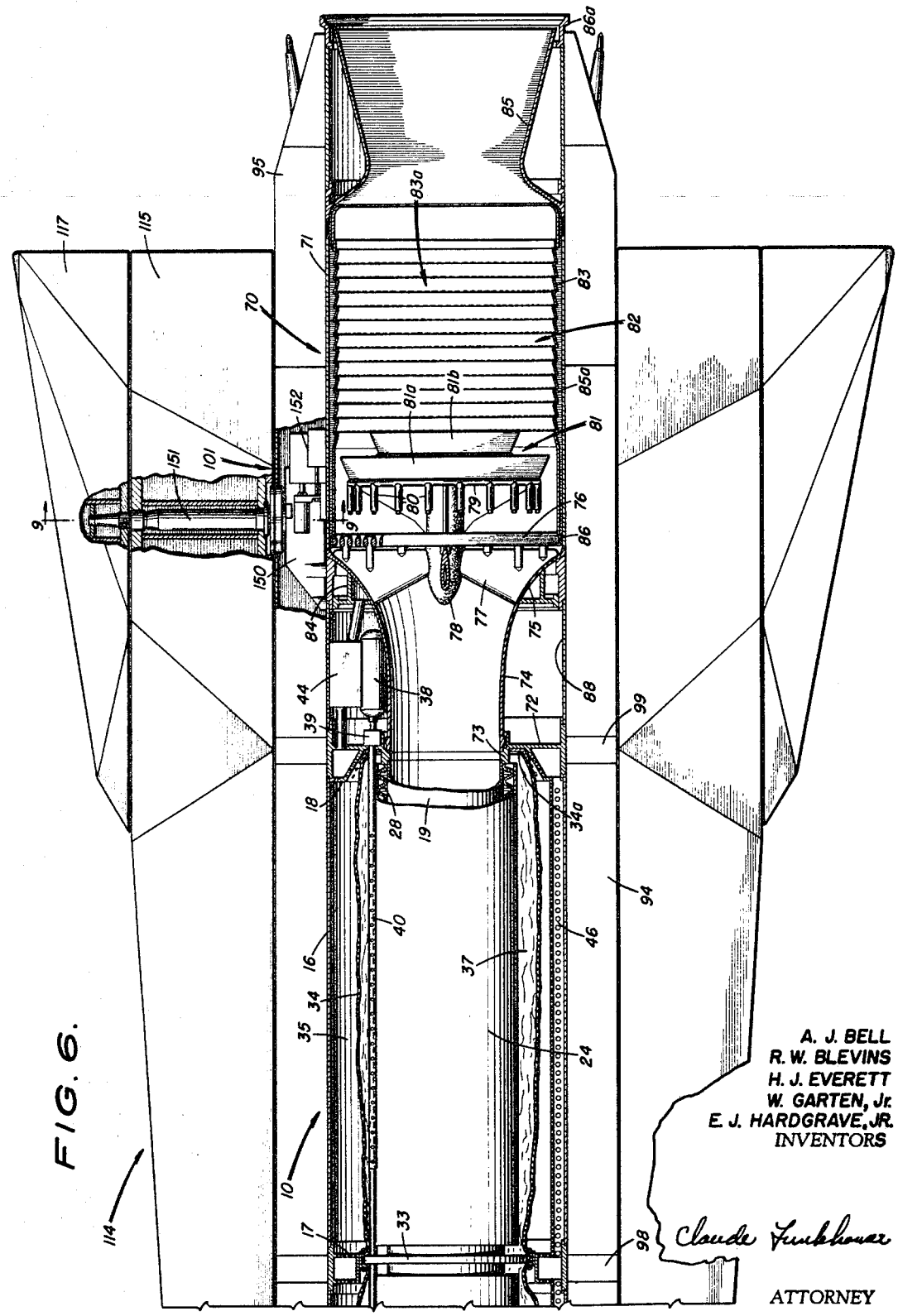

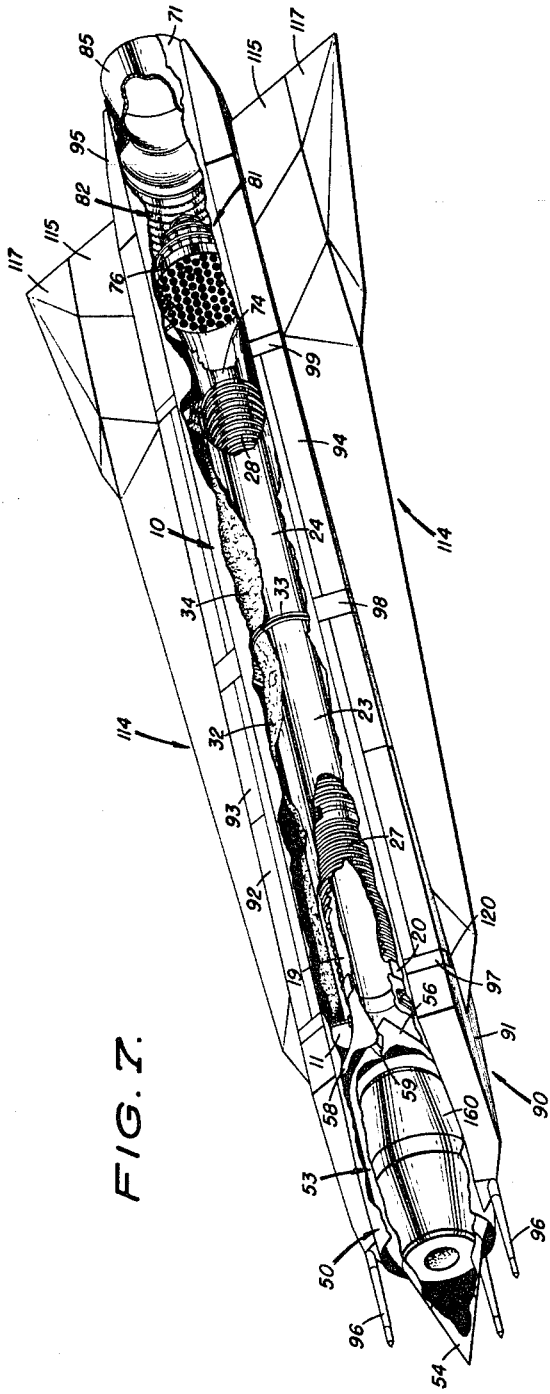
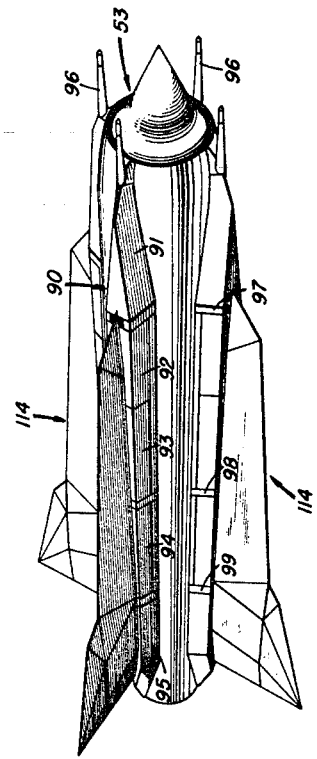

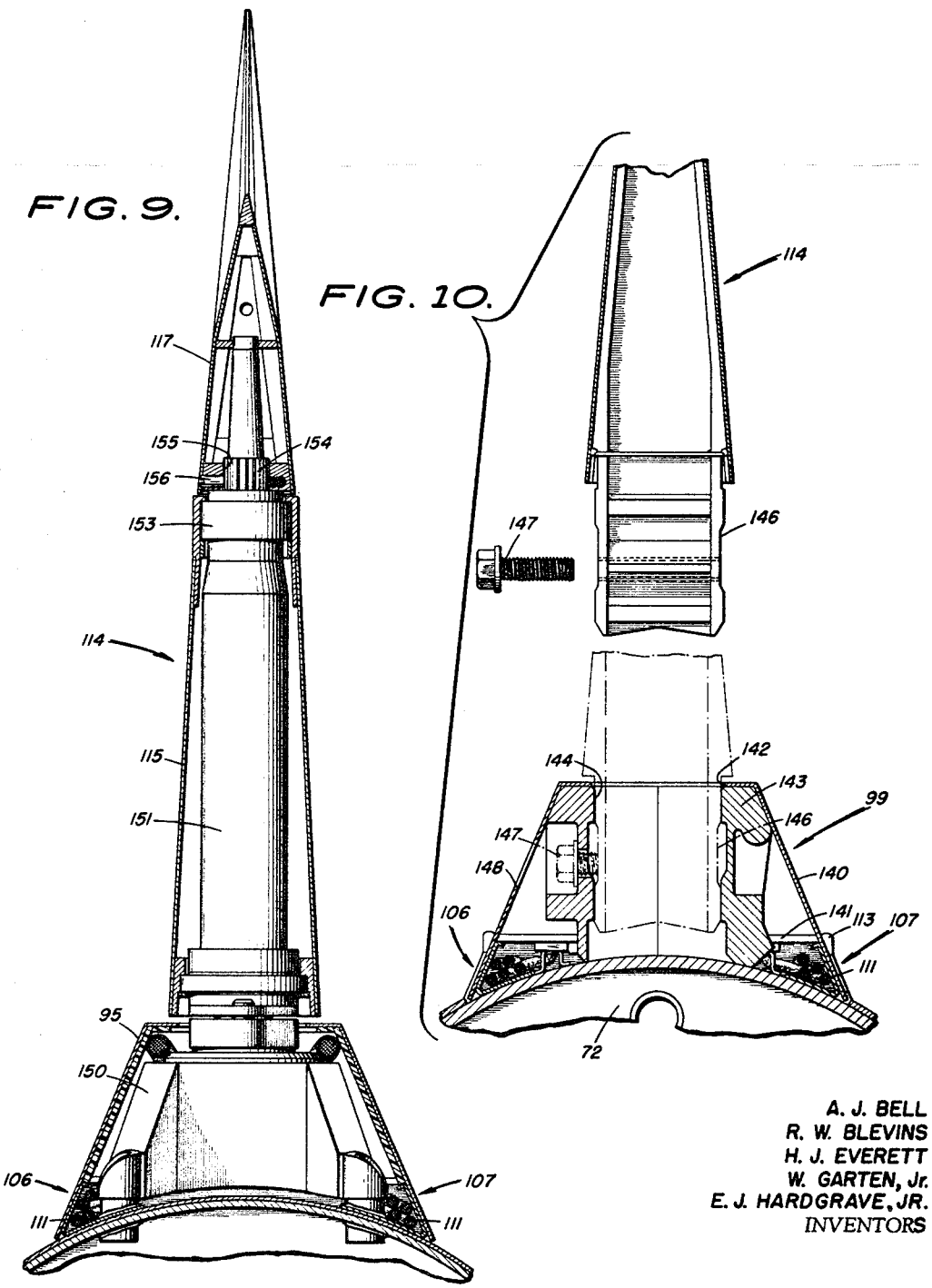

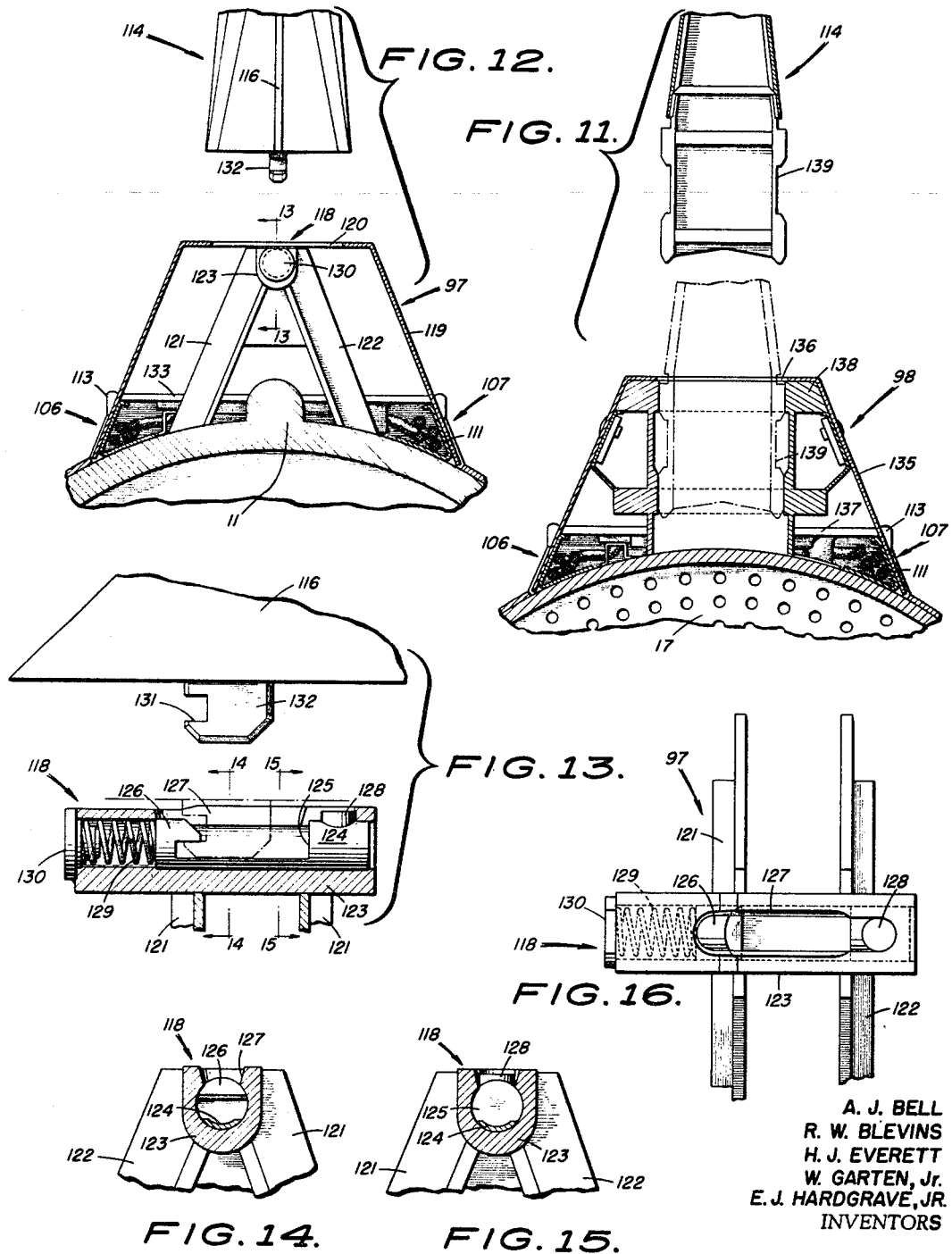

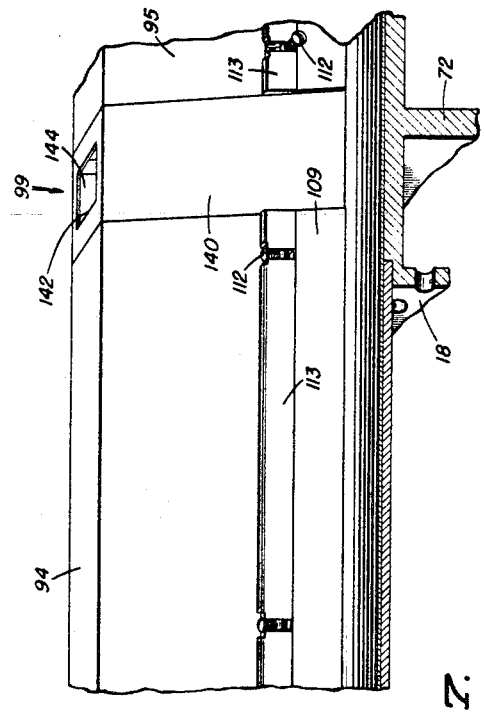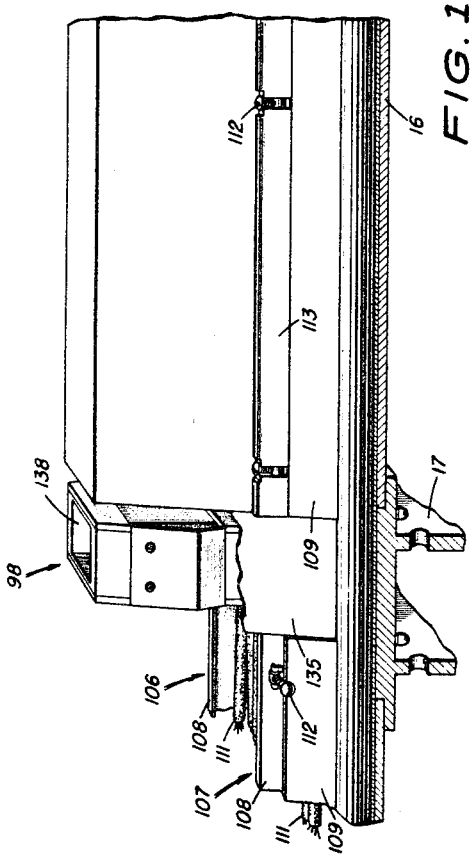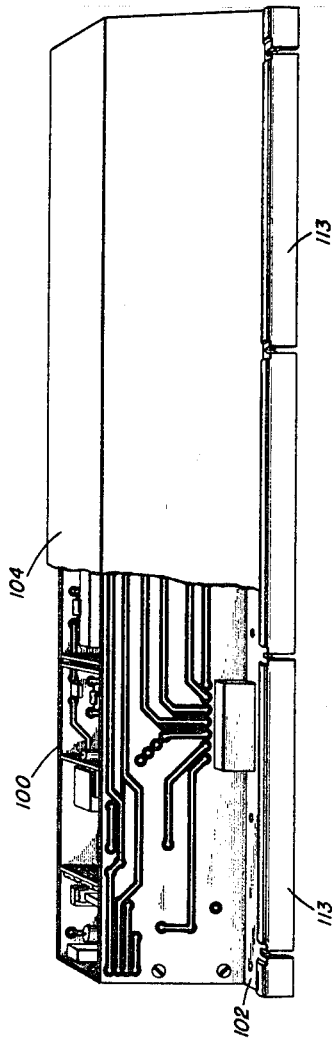

3,403,873
GUIDED MISSILE
Alfred J. Bell and Ralph W. Blevins, Silver Spring, Harvey J. Everett, Kensington Heights, and William Garten, Jr., and Everett J. Hardgrave, Jr., Silver Spring, Md., assignors to the United States of America as represented by the Secretary of the Navy
Filed Jan. 24, 1963, Ser. No. 254,024
5 Claims. (Cl. 244—3.21)

The present invention relates to aerial missiles designed for use in surface-to-air or surface-to-surface defense installations. More particularly, it relates to an improved guided missile which is designed for use with a missile system that includes an integrated volume scan radar and fire control radar, associated launching, magazine, and handling equipment, and a central control system for effecting data processing and decision-making functions.

One of the more important objects of the invention is to provide an aerial missile of the ram-jet type wherein the airframe employed is fitted with external housings for containing guidance and other electronic equipment, and which also serve to mount the wings and fins of the missile, the construction permitting protection of said guidance and electronic equipment from heat and vibration and providing greater fuel capacity for the missile.

Other objects of the invention reside in the provision of a guided missile which is relatively light in weight because of the elimination of joints between airframe sections, and that is so designed as to provide maximum accessibility to components for testing and repair.

A further object of the invention is to provide an aerial missile that is relatively simple in construction and is easy to package, so that its several sections may be made by different fabricators without deleterious effects on the completed missile.

As still further objects the invention provides a guided missile that is capable of operating at advanced supersonic speeds, which is able to climb at steep angles from booster separation altitude to cruise altitude, and that also will have maximum range at sea level.

And another object of the invention is to provide a missile which is so designed that it will be compatible with existing shipboard stowage requirements.

Other objects and many of the attendant advantages of the present invention will be readily appreciated as the same becomes better understood by reference to the following detailed description when considered in connection with the accompanying drawings, wherein:

FIG. 1 is a perspective view of the guided missile constituting the present invention as it would appear in flight toward a target;

FIG. 2 is a side elevation of the missile shown in FIG. 1;

FIG. 3 is a rear elevation of the improved guided missile;

FIG. 4 is a front elevation thereof;

FIG. 5 is an axial section, partly in elevation, of substantially the forward half of the missile;

FIG. 5a is a detail sectional view showing the arrangement of the channel members employed in the fuel distribution system;

FIG. 6 is a view similar to FIG. 5 but showing substantially the aft half of the missile;

FIG. 7 is a perspective view of the missile seen from the forward quarter and broken away longitudinally to show the warhead, fuel system, combustor, and exit nozzle;

FIG. 8 is a perspective of the missile, particularly showing the external housing configuration;

FIG. 9 is an enlarged detail section, on the line 9—9 of FIG. 6, showing one of the wing tip actuating structures;

FIG. 10 is enlarged exploded section of one of the aft wing mounts;

FIG. 11 is an enlarged exploded detail section of one of the amidships wing mounts;

FIG. 12 is an enlarged exploded end view, partly in section, of one of the forward wing mounts;

FIG. 13 is a detail section of the forward wing mount, on the line 13—13 of FIG. 12;

FIG. 14 is a detail section on the line 14—14 of FIG. 13;

FIG. 15 is a detail section on the line 15—15 of FIG. 13;

FIG. 16 is a detail top plan view of the forward ring mount latch structure;

FIG. 17 is a side elevation, on an enlarged scale, showing a portion of one of the housing structures;

FIG. 18 is a side elevation showing one of the housing structures, the view being partially broken away to show an electronic module therein; and FIG. 19 is an enlarged detail vertical section of one of the housing structures with an electronic module therein.

In general, the guided missile constituting the present invention is designed for surface-to-surface, antiaircraft, and antimissile applications. After launching it may be boosted to relatively low supersonic speed by a separate solid fuel rocket, and thereafter accelerated to and maintained at a relatively high supersonic speed by a ramjet engine. The missile embodies a novel aerodynamic configuration, employing four symmetrically spaced wings, the tips of which are constituted by pivoted fins that are utilized as control surfaces. The wings are arranged in cruciform configuration, being supported by appropriate fittings which are mounted on the ramjet engine body between housings that are also mounted on and extend along the exterior surface of said engine body throughout its length. The missile thus has cruciform wing tip control, whereby transverse movements may be effected by similar actuation of the appropriate pair of wing tips, roll control being accomplished by differential deflection of the wing tips.

Referring now more particularly to the drawings, and first to FIGS. 5 and 6 thereof, the body of the improved guided missile is indicated generally at 10. The body 10 extends throughout the major portion of the length of the missile and terminates at its forward end in a bulkhead 11 which is formed with a central aperture 12. Internal radial and axial flanges 13 and 14, respectively, are formed on the bulkhead, for a purpose to be set forth hereinafter. As will be seen, the body 10 comprises forward and aft tubular sections 15 and 16, respectively, which are connected at their confronting ends by an amidships manifold ring 17 which has perforated side walls and a smooth outer surface that is flush with the outer surfaces of the sections 15 and 16. At its aft end the body is provided with a fuel distribution ring 18. A duct 19 extends throughout the major portion of the length of the body, and has a sleeve 20 attached to the outer surface of its forward margin, which sleeve is mounted for limited sliding movement on a forward duct section 21 that is slightly flared at its forward end. As best seen in FIG. 5, the duct section 21 is provided with a flange 22 that is bolted to the bulkhead 11. The sleeve 20 and the forward duct section 21 cooperate with the duct 19 to provide a slip joint which will allow for the small longitudinal displacements caused by expansion and contraction of the duct due to heat differentials therealong.

Surrounding the duct 19 are forward and aft insulation sleeve sections 23 and 24, the sleeve section 23 being formed with an enlarged forward end portion 25 that is mounted for sliding engagement on a stub sleeve section 26, to form a slip joint similar to the slip oint provided for the duct 19. The sleeve sections 23 and 24 may conveniently be made of "Min–x," a ceramic coated on each surface with steel foil. Corrugations 27 and 28 surround the duct 19, between the sections 23 and 24 and said duct, and reenforce it to prevent collapse by fuel pressure or by duct burst pressures. The corrugations are welded to the duct to assure rigidity. A bellows 29 surrounds the sleeve 20 and the aft end portion of the duct section 21 to provide an expansion joint for the duct. Movement of the forward end of the bellows is limited by an abutment ring 29a.

At the forward end of the body, and secured to the flanges 13 and 14 of the bulkhead 11, is a perforated fuel discharge ring 30. As will be seen, the ring 30 is provided with an annular flange 31 that cooperates with the flange 14 for clamping the forward margin of a flexible bladder 32 that extends about the insulation sleeve section 23 throughout its length. The bladder has its aft end margin clamped between the inner wall of the amidships manifold ring 17 and the outer wall of a separating ring 33 which surrounds the duct 19 substantially medially of its length. The rings 17 and 33 also clamp the forward end margin of a bladder 34 which surrounds the insulation sleeve section 24, and has its aft end margin secured to a clamping ring 34a adjacent distribution ring 18.

From the foregoing description it will be understood that the bladders 32 and 34 serve to define, within the body 10, an annular fuel tank 35 and a pair of fuel pressurizing tanks 36 and 37. The fuel tank 35 extends throughout the length of the body and includes the rings 17, 18, and 30, the outer walls of the bladders 32 and 34, the inner walls of forward and aft tubular sections 15 and 16, and the annular portion of the bulkhead 11 outwardly of the flange 14. The fuel pressurizing tank 36, which is located concentrically within the forward portion of the fuel tank 35, includes the inner wall of the bladder 32, the outer wall of the insulation sleeve section 23, the outer wall of the stub sleeve 26, the forward wall of the separating ring 33, and the annular portion of the bulkhead 11 inwardly of the flange 14. Similarly, the fuel pressurizing tank 37 is formed by the inner wall of the bladder 34, the outer wall of the insulation sleeve section 24, the aft wall of the separating ring 33, and the forward face of the clamping ring 34a.

Fuel is forced from the tank 35 by expansion of the bladders 32 and 34, either simultaneously or consecutively, as may be desired. More specifically, nitrogen under pressure from a tank 38 is supplied to a manifold 39 and from the manifold to tubes 40 and 41 that extend along the walls of the sleeves 23 and 24 within the tanks 36 and 37, respectively. The tube 40 extends only within the tank 37 and is perforated throughout its length; the tube 41 extends through the tanks 37 and 36 but is perforated only within the tank 36. Fuel forced from the tank 35 passes from the fuel distribution ring 18 into a fuel distribution system that includes a suitable pump and metering valves, and is shown diagrammatically at 44. To prevent trapping of fuel in portions of the tank 35 by the expansion of the bladders 32 and 34, perforated channel members 45 and 46 are secured to the outer wall of the body 10 within said tank. The channel members, one of which is shown in cross-section in FIG. 5a, are secured to the rings 30, 17, and 18.

A cowl 50 is secured to the forward end of the body and has a cylindrical wall 51 which is slightly tapered toward its forward end and terminates at said forward end in an inwardly directed cowl inlet lip 52. The cowl is secured to the bulkhead 11, and the outer surface of said cowl is flush with the outer surface of the body 10. Mounted axially within the cowl is an innerbody 53 which is generally cylindrical and has a conical forward end portion 54 that extends beyond the cowl inlet lip 52, and an isentropic compression surface 55 which is located within the cowl directly aft of said lip. The innerbody 53 is provided with a generally conical aft end portion 56 which, with the wall of said innerbody and the compression surface 55, defines a supersonic diffuser 57. The innerbody 53 is secured to an aft diffuser section 58 by struts 59, and said aft diffuser section is in turn secured to the bulkhead 11 by struts 60. As best seen in FIG. 5, the aft diffuser section is generally frusto-conical and has its smaller end fitted into an annular recess 61 in the duct section 21. The larger end of the aft diffuser section is formed with a thickened rim 62 which has a flat annular bearing surface 63 that confronts a like surface 64 on the aft end of the cowl 50. A sealing element 65 is interposed between the surfaces 63 and 64 to prevent escape of high pressure air from the diffuser 57. The forward end portion of the inner-body is supported in the diffuser inlet by struts 66.

The combustor of the missile is shown in FIG. 6. In general, the combustor includes an outer shroud which is of the same diameter as the body and, within the shroud, an expansion pipe, a grid, and a combustion chamber, said chamber containing fuel injection nozzles, a flame holder, a tailpipe, and an exit nozzle. In more detail, the combustor is shown generally at 70 and the shroud at 71. The shroud 71 is suitably secured to an aft bulkhead 72 that includes the fuel distribution ring 18, and which is provided with a central sleeve 73. The forward end portion of the sleeve 73 is recessed to receive and support the aft end of the duct 19, and the aft end of said sleeve is enlarged to receive the forward end of an expansion pipe 74 that is formed integral with the shroud 71 and which has a flared, or bell-like, aft end portion 75.

Mounted in the shroud at the aft end of the expansion pipe 74 is an aerodynamic grid 76 that consists of a flat circular perforated plate supported by struts 77. The grid 76 and the struts 77 axially mount a stem 78 which supports a fuel distribution ring 79, having injection nozzles 80 spaced about its circumference, and a flame holder 81, said flame holder including concentrically arranged gutters 81a and 81b. As best seen in FIG. 6, the grid 76 is positioned in the upstream end of a tailpipe 82 which is provided with a perforated corrugated wall 83, and the fuel distribution ring 79 and flame holder 81 are mounted within said tailpipe downstream of said grid. As will be understood, the aft end of the expansion pipe 74 and the tailpipe 82 define a combustion chamber. The struts 77 are hollow and communicate at their outer ends with a fuel supply ring 84 and at their inner ends with the stem 78 which is also hollow. A suitable conduit connects the ring 79 with the fuel distribution system 44. It will thus be seen that fuel forced from the tank 35 will pass into the distribution system 44 and thence into the fuel supply ring 84, through the struts 77, stem 78, and distribution ring 79, for ejection through the nozzles 80. As will be described in more detail hereinafter, ejected fuel is mixed in the combustor with air from the duct 19 and is ignited by suitable means (not shown) and burned. An exit nozzle 85 is mounted in the aft end portion of the shroud 70 to conduct thrust-producing products of combustion from the missile. As will be seen in FIG. 6, the wall 83 of the tailpipe 82 is spaced from the wall of the shroud, to provide an air jacket 85a. Openings 86 in the forward end of the wall 83 communicate with the interior of the expansion pipe 74, with the result that relatively cool air will pass into the jacket 85a and assist in cooling the tailpipe and nozzle. An end ring 86a surrounds the aft end of the exit nozzle 85 and is secured to the aft end of the shroud 70.

Attention is now directed to FIGS. 2, 7 and 8 of the drawings, wherein the externally mounted housings, with the wings and control surfaces thereon, are shown. The housings, which are four in number, are of generally trapezoidal cross-section and are arranged about the body in cruciform style, and extend throughout the major portion of the length of the missile. The housings contain the electronics modules and, with an annular compartment 88 aft of the fuel tank, the hydraulic and electrical power supplies, the fuel pressurization system and the actuators for the control surfaces. The body, housings, cowl, tailpipe, wings and control surfaces constitute the airframe of the missile, which airframe constitutes a high-speed guided missile design in which the structural materials and methods of construction used will efficiently meet strength, stiffness, weight, and cost specifications. The body carries the basic load and also meets aeroelastic stiffness requirements, and the housings containing the electronics are firmly secured to the body.

The overall aerodynamic configuration of the missile is that of a dart, and includes four symmetrically spaced, delta shaped wings. The tips of the wings are constituted by pivoted fins that function as control surfaces, with the result that transverse movements of the missile may be effected by similar actuation of the appropriate pair of control surfaces, while roll control may be obtained by differential deflection of said control surfaces.

The housings are indicated generally at 90 in the drawings, and each includes a tapered forward section 91, amidships sections 92, 93 and 94, and an aft section 95, the downstream end of which is tapered toward the aft end of the missile. As will be seen, the tapered forward sections 91 of the housings 90 overlie the cowl section 50 and provide mountings for antennas 96 that project forwardly beyond the cowl lip 52 parallel to the axis of the conical forward end portion 54 of the innerbody. Foward fittings 97 (FIGS. 2, 12 and 13) are mounted on the body near its forward end and aft of the housing sections 91. Amidships and aft fittings 98 and 99 (FIG. 17) are mounted, respectively, between the amidships sections 93 and 94 and between the amidships section 94 and the aft section 95. The housing sections 92, 93 and 94 contain electronics modules, a typical one of which is shown at 100 in FIGS. 18 and 19. Fin control and actuating mechanisms 101 (FIG. 63), together with power supply and other apparatus (not shown), are mounted in the aft housing sections 95. Referring again to FIGS. 18 and 19, it will be seen that the housing sections each include a base 102 which is formed with a well 103 to receive one of the modules 100, and a cover 104 which is secured to the base by screws 105. The housing sections are detachably mounted on the body 10 of the missile by supports 106 and 107 that extend along said body in parallel spaced relation. The supports 106 and 107 each include angle members 108 and side plates 109, and define conduits 110 for receiving cables 111 for connection to the modules. Fasteners 112 are provided at spaced points along the side plates 109 (FIG. 17) and engage side flanges 113 on the base 102 for retaining the housing sections in place on the body of the missile.

The four symmetrically arranged wings are identical in shape and construction, so that a description of one will suffice for all of them. As best seen in FIGS. 2, 7 and 8, each said wing includes an airfoil 114 having a trapezoidal aft end section 115 and a forwardly tapered section 116. Pivotally mounted with respect to the aft end section 115 of the airfoil 114 is a control fin 117. The structures for detachably mounting the airfoil on the body of the missile, in overlying relationship to the housing 90 throughout the major portion of its length, will now be briefly described.

The fittings 97, which are used for securing the corresponding forward end portions of the airfoils 114 to the missile body 10, are best seen in FIGS. 12 through 15 and are of identical construction, so that a description of one will suffice for all of them. Each of the fittings 97 includes a latch 118 that is mounted within a cover 119 and is supported directly beneath an opening 120 in said cover by upwardly converging spaced supports 121 and 122. The latch 118 includes a tubular housing 123 in which is mounted for sliding movement a plunger 124 having a recess 125 that is undercut at one end to form a keeper 126. The top of the housing 123, directly beneath the opening 120, is formed with a slot 127, and slidable in the slot is a stop 128 which is formed on the plunger 125 at the end thereof remote from the keeper 126 and which limits axial movement of the plunger. A coil spring 129, confined in the housing 123 between the keeper end of the plunger and a closure cap 130, normally urges said plunger toward the opposite end of the housing, with the stop 128 in engagement with the adjacent end of the slot 127. As is shown in broken lines in FIG. 13, the keeper 126 is normally engaged in a notch 131 in a keeper plate 132 that is mounted on the forward end portion of the section 116 of the airfoil 114. Release of the forward end of the airfoil 114 is effected by retracting the plunger 124 against the compression of the spring 129 for freeing the keeper from the notch.

A flat base plate 133 extends transversely of the cover 119 near its lower end and houses the cables 111 as they pass through the fitting 97.

In FIG. 11 is shown the detail contruction of one of the fittings 98, which supports each of the airfoils 114 substantially medially of its length. Each fitting 98 includes a cover 135 which is shaped to conform to the configuration of its associated housing 90, the cover having an opening 136 in its outer wall. A bottom plate 137 provides a cover for cables 111 passing through the fitting. Mounted within the cover 135 and aligned with the opening 136 is a sleeve 138 which, as shown in broken lines, normally receives a plug 139 on the airfoil 114.

The aft end of each of the airfoils 114 is secured to its associated housing 90 by one of the fittings 99, which is shown in FIG. 10. Each fitting 99 includes a cover 140, which is similar to the covers 119 and 135, and a bottom plate 141 that serves the same purpose as the plates 133 and 137. An opening 142 is formed in the outer wall of the cover 140. Fitted within the cover 140 in alignment with the opening 142 is a sleeve 143 which defines a socket 144 for receiving a plug 146 on the airfoil 114. A screw 147, which is passed through an opening 148 in a side wall of the cover, normally secures the plug 146 in the socket 144, as shown in broken lines.

As previously described, steering moments are applied to the missile by the control fins 117 that are pivotally mounted on the aft end sections 115 of the airfoils 114. The fins 117 are of trapezoid shape, and are moved about their pivots by mechanism now to be described. The fins 117, like the airfoils 114, are four in number and are of identical construction, so that a description of one will suffice for all of them. An actuating mechanism for a typical fin is shown in FIGS. 6 and 9, and reference is now made to these views. Mounted on the body 10 within the aft section 95 of the housing is an actuator casing 150, and extending from the casing is an actuator shaft 151. Also mounted within the aft housing section 95 but exteriorly of the casing 150 is an actuator mechanism 152 that may comprise suitable servo devices appropriately connected to the guidance mechanism mounted in other sections of the housing 90. Since the fin actuator structure may be altered without departing from the spirit of the inventon, it will not be described in greater detail herein. The outer end portion of the shaft 151 is journaled by a bearing 153 and is reduced to define a hub 154 which is secured in a socket 155 in the base, or root, of the fin by a threaded pin 156.

Referring again to FIG. 7 of the drawings, the innerbody 53 contains a warhead 160 which may be of the continuous rod type shown and described in U.S. patent application Ser. No. 590,078, filed June 7, 1956, E. L. Nooker, inventor (assigned to the U.S. Government), or may be of the more conventional high-explosive type. The warhead may be detonated by a proximity fuze (not shown) that may be mounted in the conical forward end portion 54 of the innerbody or within one of the housings 90.

In operation, the missile of the invention is accelerated to relatively low supersonic speed, say Mach 2.8, by a booster (not shown) in a conventional manner. After the booster is expended and drops away, the ramjet engine accelerates the missile to relatively high supersonic speeds, say Mach 4 or higher, and sustains it at such speeds during the cruise phase of its flight toward a target. After separation of the booster air is compressed through a conical shock generated at the conical forward end portion 54, and subsequently by the isentropic compression surface 55 which further reduces the air speed with a resulting increase in static pressure. At the inlet lip 52 the flow, although reduced in speed, is still supersonic. The airflow speed is reduced to subsonic conditions by a plane shock normal to the flow just inside the diffuser lip.

The initial subsonic diffusion occurs in a section of expanding area surrounding the innerbody 53, which subsonic diffusion minimizes pressure losses occurring in the narrow annulus surrounding the innerbody, said annulus constituting the diffuser 57. Airflow is reaccelerated in the duct 19 and is conducted thereby into the combustion chamber 83a. This accelerated flow results in pressure losses but minimizes the volume required for the airflow passage. At the combustion chamber inlet, i.e., at the aft end of the expansion pipe 74, the passage is reexpanded rapidly to provide maximum packaging volume in the surrounding annulus. High pressure air for operating fuel and hydraulic turbines (not shown) is supplied through flush holes in the wall of the pipe 74. The aerodynamic grid 76 provides a flat airflow profile at the combustion chamber inlet, and the flame holder 81, which includes the concentric gutters 81a and 81b for promoting flame spreading, assure complete combustion of the mixture of air and fuel, the latter from the nozzles 80. An annular flow of air between the shroud 71 and the tailpipe 82, maintains the tailpipe and exit nozzle relatively cool. As seen in FIG. 6, the fuel injection nozzles 80 are close-coupled to the flame holder 81, and inject fuel contra-stream. Ignition is supplied by a single spark plug (not shown) that is mounted with its electrodes in the sheltered region of the outer gutter 81a.

It is desired particularly to emphasize that the housings 90, which extend longitudinally of the missile on the exterior of the body and in cruciform arrangement, provide enclosures for guidance and auixilary equipment that would otherwise be positioned within the missile body. As a result the guidance and auxiliary equipment are protected from the effects of extreme heat, and more is provided within the missile for fuel. Moreover, the use of the housings permits the production of a missile of smaller size than missiles heretofore constructed, but with increased effectiveness, because a greater number of missiles can be stored in the space formerly required for missile storage, and the missile lends itself particularly well for use on launchers already in operation.

It is also desired to emphasize that the wing configuration, with control surfaces at the wing tips, permits large control moments to counteract any induced rolling moments during a maneuver in a nonsymmetrical condition. Also, a plot of induced rolling moment and roll control moment for various differential control surface deflections indicates the ability of the control surfaces to counteract the maximum induced rolling moment statically with less than six degrees differential control surface deflection.

Obviously many modifications and variations of the present invention are possible in the light of the above teachings. It is therefore to be understood that within the scope of the appended claims the invention may be practiced otherwise than as specifically described.

We claim:
1. In an aerial missile having a cylindrical body:
means for supporting in-flight behavior controlling components on the body exteriorly thereof,
said means including a plurality of housings mounted on the body symmetrically thereabout,
said housings each including a plurality of housing sections arranged longitudinally of the body, and
wings positioned exteriorly of said means and having portions secured to the body between the sections.

2. In an aerial missile:
a cylindrical body,
housings on the body and extending longitudinally thereof,
said housings being of substantially trapezoidal cross-section and being arranged symmetrically about the body, each of said housings comprising a plurality of longitudinally arranged housing sections.
wing supporting means on the body and positioned between certain of the housing sections,
wings detachably mounted on said means,
control fins pivotally mounted on said wings,
and means in certain of said housing sections for moving said fins about their respective pivots.

3. In an aerial missile:
a body of tubular contour,
housings arranged in cruciform configuration on the exterior of the body and extending longitudinally thereof throughout substantially its entire length,
each of said housings comprising a plurality of housing scetions,
each of said housing sections including a base, a functional module on the base, a cover, and means securing the cover to the base,
cables extending along the outer surface of the body beneath the housings and connected to said functional modules,
forward, amidships, and aft fittings on the body and mounted between certain of the housing sections,
wings mounted on the cover,
and means on the wings and engageable with the fittings for detachably securing the wings to the body.

4. An aerial missile as recited in claim 3, including additionally:
control fins on the aft end portions of the wings,
means mounting the control fins for pivotal movement on the wings,
and means mounted in certain of the housing sections and connected to said last-mentioned means for imparting pivotal movement to said wings, said last-mentioned means comprising a plurality of housings extending longitudinally of the body, each of said housings comprising a plurality of housing sections enclosing modules including guidance and control apparatus.

5. In an aerial missile:
a body having a cowl and a combustor,
a duct mounted within the body and extending axially thereof,
an innerbody mounted within the cowl, said innerbody having a conical forward end portion extending beyond the forward end of the cowl and cooperating therewith to define an inlet,
said cowl and innerbody defining a diffuser,
means communicating the diffuser with the duct,
fuel supply means in the body,
means in the combustor for burning a mixture of air from the duct and fuel from said supply means in said combustor for developing thrust during forward movement of the missile,
housing means on the body in cruciform arrangement thereabout,
and wings secured to the body and having root portions confronting the housing means,
each of said wings having a trapezoidal aft end section and a forwardly tapered section.

(References on following page)

References Cited

UNITED STATES PATENTS

| | | | | |
|---|---|---|---|---|
| 2,647,707 | 8/1953 | Hill et al. | 244— | 14 |
| 2,943,815 | 7/1960 | Besson | 244— | 14 |
| 3,000,597 | 9/1961 | Bell et al. | 102— | 49 |
| 3,038,408 | 6/1962 | Kluge | 60— | 35.6 |
| 3,112,902 | 12/1963 | Kongelbeck | 244— | 14 |
| 2,946,285 | 7/1960 | Nauschutz et al. | 102— | 49 |
| 2,928,237 | 3/1960 | Niles | 60— | 35.6 |
| 2,966,117 | 12/1960 | Lauritsen | 102— | 50 |
| 2,992,794 | 7/1961 | Boyd | 102— | 49 |
| 3,034,434 | 5/1962 | Swaim et al. | 102— | 50 |
| 3,048,109 | 8/1962 | Feemster | 102— | 50 |
| 3,093,075 | 6/1963 | Garrett et al. | 102— | 50 |

FOREIGN PATENTS 871,712    6/1961    Great Britain.

BENJAMIN A. BORCHELT, *Primary Examiner.*

V. R. PENDEGRASS, *Assistant Examiner.*